United States Patent [19]

Maki et al.

[11] 4,332,148
[45] Jun. 1, 1982

[54] CYCLIC PHASE-CHANGE COUPLING

[75] Inventors: Emil R. Maki, Rochester, Mich.; Ferdinand Freudenstein, Riverdale, N.Y.

[73] Assignee: General Motors Corporation, Detroit, Mich.

[21] Appl. No.: 156,321

[22] Filed: Jun. 4, 1980

[51] Int. Cl.³ .............................................. F16D 3/04
[52] U.S. Cl. .................................... 464/102; 464/147
[58] Field of Search .............................. 64/31, 24, 16

[56] References Cited

U.S. PATENT DOCUMENTS

| | | | |
|---|---|---|---|
| 19,887 | 4/1858 | Wilmarth et al. | 64/31 |
| 1,244,533 | 10/1917 | Morse | 64/31 |
| 1,595,942 | 8/1926 | Jacobs | 64/16 |
| 2,011,147 | 8/1935 | Haselau | 64/31 |
| 2,551,735 | 5/1951 | Goff | 64/31 |
| 2,783,589 | 3/1957 | Wiley | 64/9 R |
| 2,932,255 | 4/1960 | Neukirch | 64/31 |
| 3,404,545 | 10/1968 | Walker | 64/31 |
| 4,131,096 | 12/1978 | Mitchell | 64/25 |

Primary Examiner—Ira S. Lazarus
Attorney, Agent, or Firm—Robert J. Outland

[57] ABSTRACT

A cyclic phase-change coupling in which opposed ends of two members rotatable on parallel offset axes are connected by an intermediate member through guide means which restrict lateral motion of the intermediate member with respect to both other members to separate arcuate paths, the axial projections of which intersect within the lateral boundaries of the intermediate member. In a preferred form, the arrangement comprises a curved key and groove variation of a standard Oldham shaft coupling that provides a cyclic phase change between the offset shafts rather than the fixed phase rotation of the Oldham construction.

3 Claims, 4 Drawing Figures

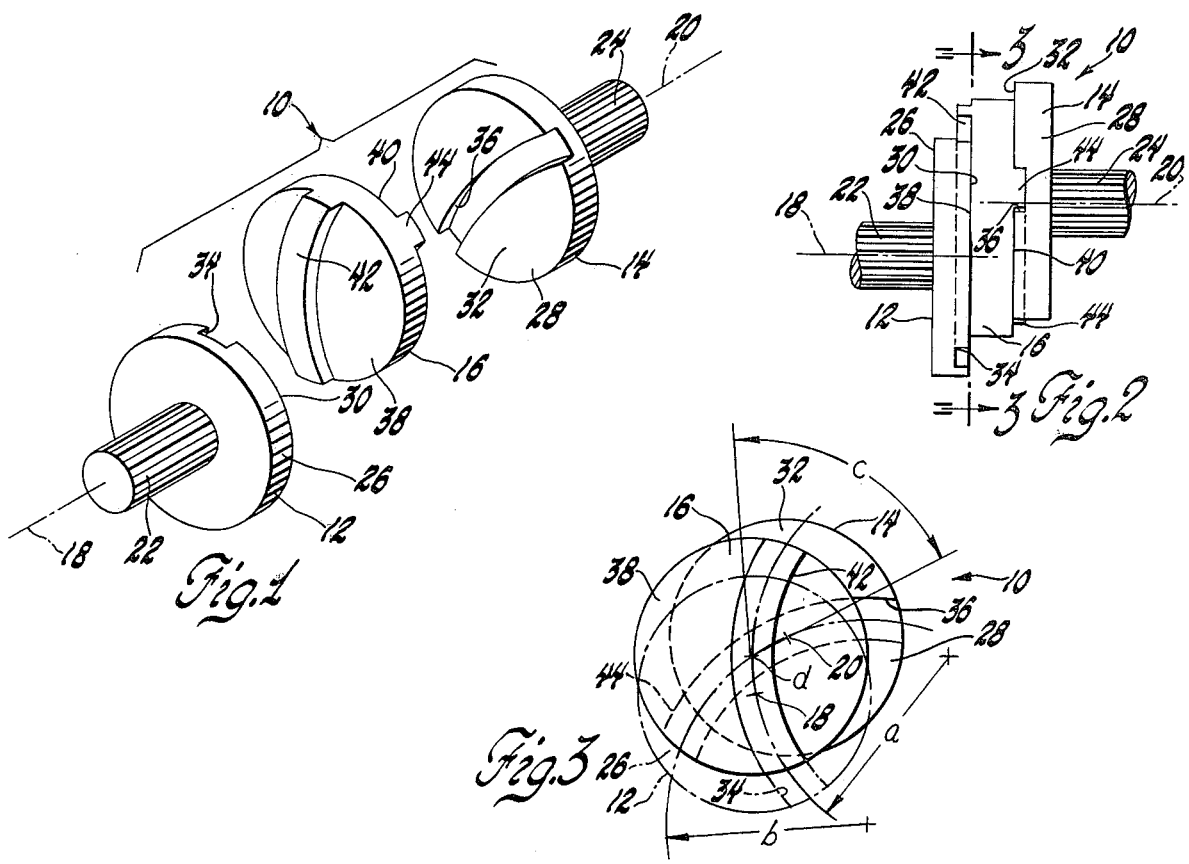
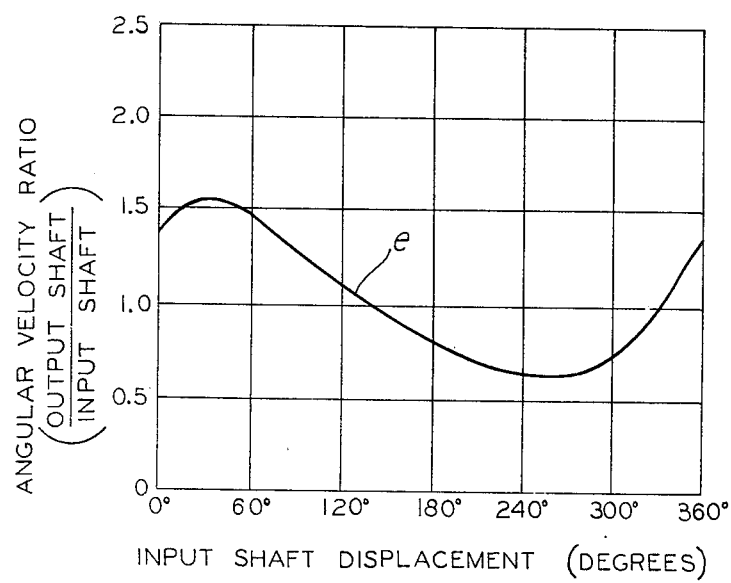

CYCLIC PHASE-CHANGE COUPLING

TECHNICAL FIELD

This invention relates to drive couplings and to cyclic phase-change mechanisms. In a particular aspect, the invention relates to a cyclic phase-change coupling arrangement for opposed end offset parallel members or shafts.

BACKGROUND

Many applications are known in the art of drive couplings which utilize features of the prior art Oldham shaft coupling to connect opposed end offset parallel members or shafts for rotation at a constant relative phase angle about respective axes. A few of many examples of couplings of this type are shown in U.S. Pat. No. 1,244,533 Morse, U.S. Pat. No. 2,932,255 Neukirch, and U.S. Pat. No. 3,404,545 Walker. All these constructions involve intermediate members connected with opposed ends of members or shafts rotatable on offset parallel axes by opposed straight guide means or keys that limit lateral motion of the intermediate members with respect to their offset members to linear paths whose axial projections intersect at right angles and cause rotation of the shafts while maintaining a fixed phase angle between them.

Devices for varying the phase angles between members rotating on offset parallel axes are also known, as shown for example in U.S. Pat. No. 4,131,096 Mitchell. Still other arrangements applicable to coaxial shafts are known such as shown in U.S. Pat. No. 2,783,589 Wiley.

SUMMARY OF THE INVENTION

The present invention provides a novel phase-change coupling mechanism which possesses the simplicity of the known Oldham coupling in a significantly different form that permits rotation on offset parallel axes of connected elements with a cyclic phase-change variation. The invention differs from the generalized form of the standard Oldham coupling in that connection of an intermediate member with opposed members rotatable on offset parallel axes is accomplished by curved path guide means intersecting at an arbitrary selected angle rather than the right angled straight guide means of the Oldham coupling.

The phase angle variation in mechanisms formed according to the invention is determined in part by the selected phase angle between the curved path guide means and by the curvatures of the respective guide means as well as by the offset between the parallel axes of the connected rotatable members or shafts. The invention permits adjustment of the phase angle change by varying the displacement of the offset rotational axes of the connected members.

These and other features of the invention will be more fully understood from the following description of a preferred embodiment chosen for purposes of illustration and illustrated in the accompanying drawing.

BRIEF DESCRIPTION OF THE DRAWING

In the drawing:

FIG. 1 is an exploded pictorial view of a cyclic phase-change coupling formed in accordance with the invention;

FIG. 2 is a side view of the assembled coupling of FIG. 1;

FIG. 3 is a transverse cross-sectional view of the coupling from the plane indicated by the line 3—3 of FIG. 2, and FIG. 4 is a graphical illustration of variations in the angular velocity ratio between connected end members during a single rotational cycle.

BEST MODE DISCLOSURE

Referring to the drawing in detail, numeral 10 generally indicates a specific embodiment of cyclic phase-change coupling formed in accordance with the invention. Coupling 10 consists of three simple elements, first and second end members 12 and 14 respectively and an intermediate member 16.

The end members 12 and 14 are rotatable about offset parallel axes 18, 20 respectively and include splined connector portions 22, 24 for respectively connecting the end members 12, 14 with separate rotatable shafts or other elements. The end members each also include disc-like end portions 26, 28 having axially opposed end faces 30, 32 respectively, across which extend axially opening arcuately curved grooves 34, 36 respectively.

The intermediate member 16 is also of disc-like shape having axially oppositely directed end surfaces 38, 40 which, in assembly, respectively engage in opposed relation end faces 30, 32 of the respective end members 12, 14. Arcuately curved keys or projections extend across the end surfaces 38, 40 and project outwardly therefrom to respectively engage, in assembly, arcuate grooves 34, 36 of the end members 12, 14.

The grooves 34, 36 and their respective keys or projections 42, 44 form interacting guide means which limit lateral movement of the intermediate member with respect to its two connected end members 12, 14 to first and second arcuately curved lateral paths corresponding to the curvature of the respective grooves and projections. The keys or projections are preferably fitted closely but freely within the grooves so that relative oscillation of the intermediate member with respect to the end members may occur while the guide means act to conduct driving torque from one of the end members acting as a drive member to the other acting as a driven member.

It should be observed, as best shown in FIG. 3, that the curved paths of the respective guide means are formed with spaced centers of curvature a and b and that the paths intersect, as projected axially upon a common transverse plane with an angle c at a point d which lies within the lateral boundaries of the intermediate member.

In operation, rotation of one of the end members on its axis, for example end member 12 on axis 18, causes concurrent rotation of the intermediate member 16 through the interlocking engagement of the groove 34 and projection 42. At the same time, the engagement of projection 44 with groove 36 of end member 14 causes rotation of the latter whenever the intermediate member 16 is rotated.

Since end members 12 and 14 rotate on spaced parallel axes 18 and 20 respectively, the intermediate member 16 must oscillate with respect to the respective end members along the curved paths of their associated guide means. Thus, the path of rotation of the intermediate member is determined in part by the radii of curvature of the guide means from their respective centers a and b and the angle of intersection c between them. The amount of offset between the axes 18, 20 of the end members is also a determining factor in this relationship.

The result is that when the input shaft or driving end member 12 is rotated at a constant speed, the output shaft rotates at the same overall speed of revolution, but at a cyclicly varying speed or velocity ratio with respect to the input shaft.

For example, FIG. 4 shows graphically, by the curve e an exemplary relationship between the angular velocities of an output shaft or end member 14 relative to the input shaft or end member 12 at various displacements in a 360° cycle of revolution. Note that in the portion of the cycle between 0° and 60° rotation, the velocity ratio of the output shaft to the input shaft is about 1.5 while in the portion of the cycle near 240° it is approximately 0.7. The ratio is 1.0 at about 135° and again about 335° of input shaft rotation.

This particular pattern is, of course, only exemplary of the cyclic phase variations which may be accomplished with cyclic phase-change couplings of the type described. The actual variations in each case will be determined, as indicated, by selection of the appropriate angles c and the arc radii a and b for the associated guide means, as well as by the displacement between the parallel axes 18, 20. Adjustment of any of these factors is thus capable of varying the phase change pattern. Such adjustment could be made, for example, by making the rotational axis of one of the end members moveable with respect to the other.

By using two-phase changers in series, an even greater range and variety of phase fluctuations can be obtained than by the use of a single unit. It is also possible to combine a single phase changer with other mechanisms as is frequently the case in phase changing mechanisms.

It should be understood that the groove and projection guide means of the illustrated embodiment are merely exemplary of many forms of guide means that might be provided between the intermediate member and the associated end members in order to restrict lateral movement of the intermediate member to predetermined arcuately curved paths with respect to the end members. The prior art references previously referred to illustrate various guide means for Oldham coupling mechanisms which could be adapted for use in the phase change mechanism of this invention. In addition, numerous other variations are also possible and are intended to be encompassed within the scope of the invention. Such could include, for example, mechanical, electric or magnetic guiding means. Thus while the invention has been described by reference to a specific embodiment, it is intended that the invention not be limited by the specific features described but that it have the full scope permitted by the language of the following claims.

The embodiments of the invention in which an exclusive property or privilege is claimed are defined as follows:

1. A cyclic phase-change coupling for connecting two bodies for rotation at equal cyclic speeds but providing a phase angle variation during each cycle, said coupling comprising:
   first and second members rotatable on offset parallel axes and having opposed ends
   an intermediate member axially aligned with the ends,
   first arcuate guide means connecting said intermediate member with said first member for limiting their relative lateral motion to a first arcuate curved path, and
   second arcuate guide means connecting said intermediate member with said second member for limiting their relative lateral motion to a second arcuate curved path,
   said first and second curved paths, as projected axially upon a common transverse plane, intersecting at a point within the lateral boundaries of said intermediate member, the relative angle and curvature of said paths being such as to cause in operation oscillation of said intermediate member relative to each of said first and second members to thereby cause a predetermined cyclic variation in phase angle between said first and second members.

2. A cyclic phase-change coupling for connecting two bodies for rotation at equal cyclic velocities while producing predetermined variations in relative phase angle between the bodies during each cycle of revolution, said coupling comprising
   first and second end members rotatable in opposed spaced relation on offset parallel axes,
   an intermediate member disposed in the space between said opposed end members and capable of lateral and rotational motion in said space
   said intermediate member being laterally and rotationally keyed to each of said end members by arcuately curved guide elements that limit motion of the intermediate member with respect to the end members to separate arcuately curved lateral paths lying in planes normal to the axes of their respective end members and wherein the axial projection of said lateral paths define a predetermined angle of intersection within the lateral boundaries of said intermediate member,
   said angle of intersection and the curvature of said guide elements being selected to provide said predetermined phase angle variations between the end members during each revolution thereof.

3. The coupling of either claim 1 or 2 wherein the offset between said parallel axes is variable to vary the phase angle change between said end members.

* * * * *